March 2, 1954 R. E. LEWTON ET AL 2,670,813
SHOCK ABSORBER
Filed June 8, 1950 3 Sheets-Sheet 1

INVENTORS
Ross E. Lewton,
Donald T. Ball.
BY Harness & Harris
ATTORNEYS.

March 2, 1954  R. E. LEWTON ET AL  2,670,813
SHOCK ABSORBER
Filed June 8, 1950  3 Sheets-Sheet 2
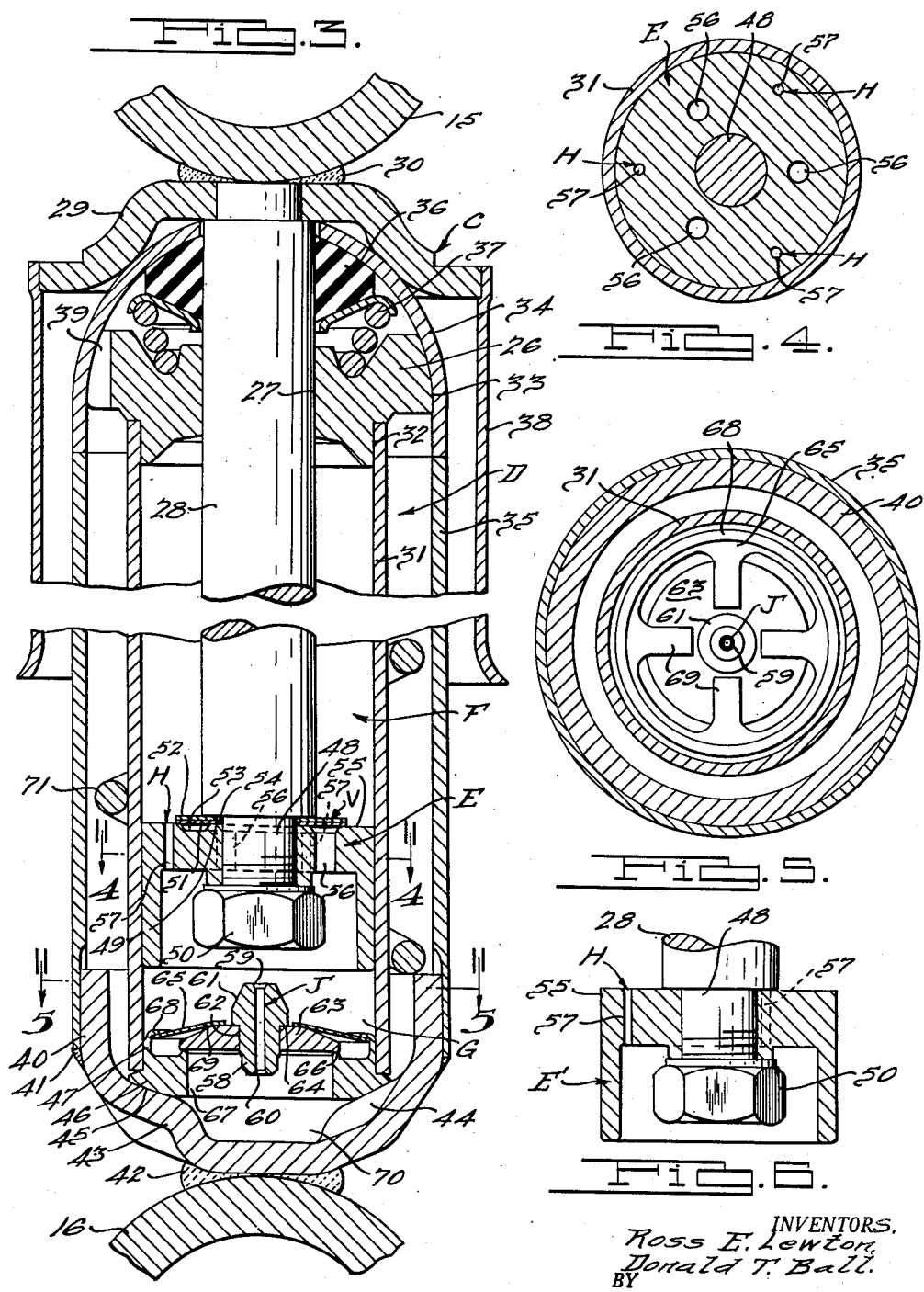
INVENTORS.
Ross E. Lewton,
Donald T. Ball.
BY
Harness & Harris
ATTORNEYS.

March 2, 1954 R. E. LEWTON ET AL 2,670,813
SHOCK ABSORBER
Filed June 8, 1950 3 Sheets-Sheet 3

INVENTORS.
Ross E. Lewton,
Donald T. Ball.
BY Harness & Harris
ATTORNEYS.

Patented Mar. 2, 1954

2,670,813

UNITED STATES PATENT OFFICE 2,670,813

SHOCK ABSORBER

Ross E. Lewton, Highland Park, and Donald T. Ball, Royal Oak, Mich., assignors to Chrysler Corporation, Highland Park, Mich., a corporation of Delaware Application June 8, 1950, Serial No. 166,958

2 Claims. (Cl. 188—88)

This invention relates to shock absorbers, and more particularly to improvements in hydraulic shock absorbers of the direct acting telescopic type commonly employed to control relative movement between the sprung and unsprung masses of a motor vehicle.

It is an object of our invention to provide a shock absorber which will function to provide improved riding comfort relative to ride characteristics of presently known shock absorbers used for example on passenger automobiles, trucks, and buses. In addition, our shock absorber provides a smoother, steadier ride with improved vehicle stability and safety over all types of roads.

Another object is to provide a shock absorber having improved simplicity of construction and assembly such that our shock absorber may be manufactured at relatively lower cost. Furthermore, our shock absorber has improved durability whereby it will perform efficiently in normal service over longer periods of use than is experienced with conventional shock absorbers.

A further object is to provide an improved method of hydraulic damping wherein the liquid medium is utilized with improved efficiency and effectiveness in controlling relative movements between the wheels and body of a motor vehicle for example.

Additional objects are to provide a shock absorber employing with improved effectiveness and simplification certain of the teachings disclosed in the copending application of Herman C. Cuskie, Serial No. 152,817, filed March 30, 1950, and to provide a shock absorber having improved characteristics of low cost manufacture, simplicity, long life, and ease of assembly.

A further object is to provide a shock absorber of improved damping efficiency and smoothness while at the same time protecting the parts of the shock absorber and its mountings against damage incident to severe action tending to produce excessive forces on such parts and mountings.

Heretofore it has been customary in commercial shock absorbers of the direct acting type to provide damping for the compression and rebound movements by means of orifices with associated pressure relief valves. Resistance to movement of fluid is induced by relative movements of the piston and cylinder and in such devices the shock absorber resistance builds up rapidly to reach its maximum resistance immediately after the beginning of its stroke as determined by a conventional blow-off type of pressure relief valve, such maximum resistance remaining approximately constant throughout most of the stroke and then decreasing abruptly just prior to the end of the stroke when the reduced piston velocity allows the blow-off relief valve to again close under the rapidly diminishing pressure of the fluid subjected to movement of the piston. On compression strokes a check valve freely permits the pressure of the liquid in the rebound chamber to equal that in the compression chamber so that only that portion of the piston area which is equal to the rod cross-section is effective in producing compression resistance. Such arrangements introduce insufficient damping control, harshness in the ride, and jolting of the passengers.

A typical example of a conventional type of shock absorber which is referred to herein in contrast with our shock absorber is shown on pages 140 and 141 of "Chrysler 1940 Shop Manual" (D–8637), copyright 1940 by Chrysler Corporation, and also on pages 111 and 112 of "De-Soto 1940 Shop Manual" (D–8636), copyright 1940 by Chrysler Corporation.

In addition, with the aforesaid prior shock absorbers, approximately the same maximum resistance is attained in the shock absorber regardless of the velocity of piston movement for all degrees of shock absorber actions which open the blow-off valve. Hence the resistance developed by the shock absorber and the damping performed is not proportioned or effectively related to the velocity of the piston stroke either on the compression jounce stroke or on the rebound stroke. Such arrangements and methods of damping forces are inefficient and impose undesired limitations on speed, safety, and comfort in driving motor vehicles over varying types of roads, especially those having washboard surfaces, chuck-holes, gravel irregularities, or other deviations from the so-called smooth boulevard surface.

Among other objections to the aforesaid prior shock absorbers are difficulty in calibrating the blow-off valves, noisy action of such valves especially under low temperature conditions experienced in winter, and an undesirably long period of time in warming-up the oil in the shock absorber before reaching average normal conditions.

Our invention has among its objects overcoming the aforesaid undesirable characteristics in conventional shock absorbers. In contrast with prior devices, we employ a novel method and means for effecting damping with improved efficiency and passenger comfort on both the compression and rebound strokes of the shock absorber.

By reason of our damping control the resistance developed by the shock absorber and the damping performed is proportioned and effectively related in an approved manner to the piston stroke velocity preferably on both the compression and rebound strokes. Instead of employing conventional damping action in which under all road conditions the damping resistance rises rapidly to a peak which is then maintained over most of the piston stroke, our damping provides a resistance which builds up smoothly and uniformly to a maximum corresponding to maximum piston velocity at substantially the mid-stroke of the piston and then falls off uniformly as the piston reaches the end of its stroke. This pattern of performance for our shock absorber is obtained for varying road conditions and for both of the compression and rebound strokes, the value of maximum resistance developed by the shock absorber being greater as the maximum piston velocity increases and in predetermined proportion to such increases. Thus the performance characteristics of our shock absorber for boulevard types of roads are fundamentally the same as those experienced on roads of varying degrees of roughness, the amount of resistance developed by the shock absorber automatically responding to varying piston velocities induced by the forces imposed on compression and rebound strokes and at all times the resistance developed is free from abrupt variations which result from use of conventional blow-off valves or other means for bringing about abrupt changes in rate of increase or decrease of pressure of the fluid in the shock absorber and resulting abrupt changes in resistance.

An object of our invention, in its preferred embodiment, is to provide simple and effective means to relieve excessive resistance during relatively high piston velocities during compression strokes of the character which might otherwise have a destructive effect on the parts of the shock absorber and its mounting. With such arrangement as the piston velocity becomes greater, the developed resistance becomes greater. However, such resistance on compression does not increase in direct proportion with increase in piston velocity but rather with progressively lessening increments of resistance increase as the piston velocity increases in equal increments.

An additional object of our invention is to improve the efficiency of direct acting telescopic shock absorbers. One characteristic of our shock absorber directed to the attainment of this object resides in a method and means of damping which utilizes a principle of additional displacement of the piston on the compression stroke for effecting the damping action whereby, in contrast with prior practice aforesaid, we obtain increased resistance in our shock absorber at fluid pressures formerly employed, the sizes of the shock absorbers under comparison being the same. Because of this and other novel features characterizing our shock absorber, undesired excessive peak resistances are not developed and at the same time oscillating tendencies between the vehicle body and wheels are damped with such smoothness and effectiveness that static conditions are restored in substantially less time than heretofore and with improved comfort to the vehicle passengers.

We have found that our shock absorber operates with such improved damping efficiency that, even though fluid pressures are not excessive, damping forces are developed which, as a practical matter especially in regard to desirability of employing more or less standard size of mounting studs, make it desirable to reduce the damping capacity of the shock absorber on compression in the ranges of relatively high piston velocities. We have operated our shock absorber both with and without the resistance relief feature of our invention and while satisfactory results both functionally and mechanically may be obtained without employing our resistance relief feature, we prefer to incorporate such feature from the standpoint of minimizing the size of mounting studs for the shock absorber and in providing a shock absorber which can be manufactured with only ordinary attention and consideration to strength and weight of materials and distortion of parts. Our resistance relief feature, when employed, is preferably associated only with the compression stroke as the intensity of rebound strokes is limited largely to the force of the suspension springing and the weight of the unsprung parts.

Further objects and advantages of our invention will be more apparent from the following description thereof which serves to illustrate the principles involved, reference being made to the accompanying drawing in which:

Fig. 3 is a sectional elevational view through our front shock absorber in its preferred form.

Fig. 4 is a sectional plan view along line 4—4 of Fig. 3 through the piston.

Fig. 5 is a sectional plan view according to line 5—5 of Fig. 3 showing the base valve assembly.

Fig. 6 is a fragmentary sectional elevational view of our piston and rod illustrating a modified construction of our shock absorber without our compression resistance relief feature.

Figure 1:
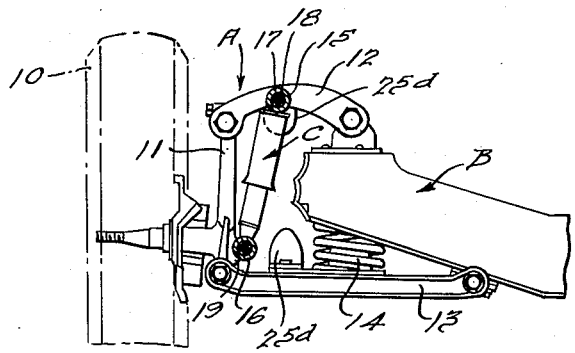
Fig. 1 is a diagrammatic elevational view of a typical vehicle front wheel suspension incorporating our shock absorber.
Figure 2:
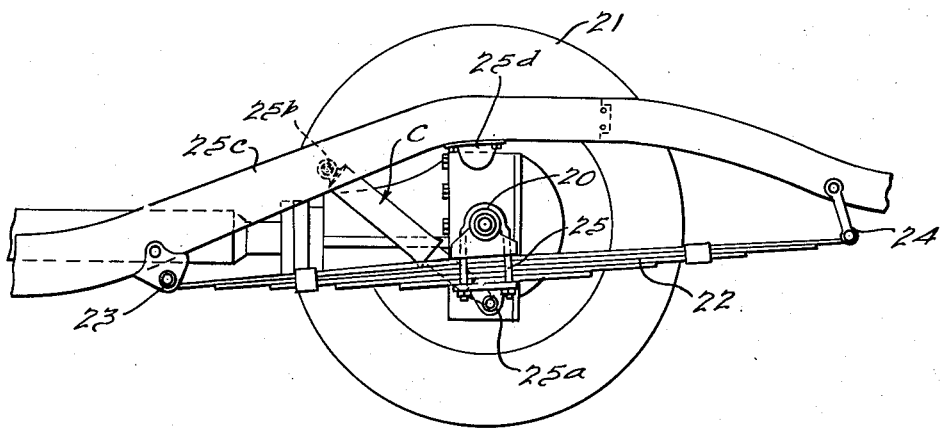
Fig. 2 is a similar view of a typical rear wheel suspension with our shock absorber.
Figure 2A:
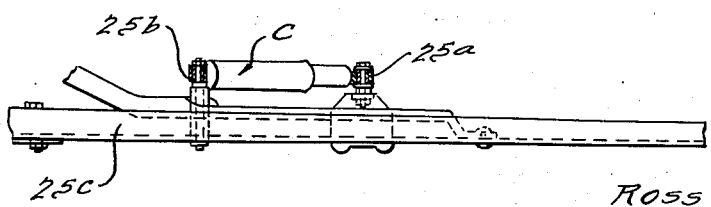
Fig. 2A is a detail plan view of the Fig. 2 rear suspension.

Referring to the drawings, we have shown our shock absorber applied to a typical vehicle front suspension in Fig. 1 and to a typical rear wheel suspension in Figs. 2 and 2A, both of generally known geometry. Our shock absorber may be used to advantage with any type of wheel suspension and, in its broader aspects, with other mechanisms and devices wherein damping of relatively movable bodies is desired. In applying our shock absorber to motor vehicles, it is only necessary to operably connect the opposite ends of the telescopic assembly respectively to two parts of the vehicle, one part moving in response to rise and fall of the ground wheel and the other part moving in response to rise and fall of the body or frame such that relative movement between the parts is under damping control by the shock absorber.

In Fig. 1 a typical steerable front ground wheel 10 is steerably supported on the upright knuckle support arm 11 of an independently sprung system A of generally conventional character having upper relatively short control arm 12 and lower relatively long control arm 13. Each control arm has its inner end pivotally mounted on the frame B of the vehicle and its outer end pivotally connected to one end of the arm 11. A coil spring 14 is positioned between the frame B and lower control arm 13 and serves, in conjunction with additional springing for the remaining wheels, to yieldingly support the vehicle body on the ground wheels.

Our shock absorber C comprises an assembly of tubular parts having operating loops or eyes 15 and 16 at its opposite ends. These eyes may be mounted one on the vehicle frame B and the other on either of the control arms 12 or 13 or at other points for effecting the desired damping control. In Fig. 1 the eye 15 is mounted by a stud 17 to the upper control arm 12, a rubber bushing 18 being disposed between the eye and stud. A similar stud and rubber bushing mounts eye 16 to an inwardly extending boss portion of the knuckle support arm 11 adjacent the lower end thereof as generally indicated at 19. In this particular arrangement it will be apparent that relative movements between frame B and wheel 10 will be accompanied by movement of the shock absorber eyes 15 and 16 either toward or away from one another, the illustrated geometry being such that approximately 2.7" wheel movement will cause 1" of "shock absorber movement" by which we mean 1" of movement of the eyes toward or from each other. Our invention is, of course, in no sense limited to any particular ratio of wheel movement to shock absorber movement either at the front or rear of the vehicle as this will vary in different types of suspensions and in the various desired locations of the shock absorber in such suspensions. Therefore, references herein to specific numerical values of wheel geometry and shock absorber parts are by way of illustrating the principles of our invention as applied to a typical vehicle from which teachings our invention may be readily adapted to other suspensions and to other wheel and shock absorber movement ratios as may be desired.

In the illustrated suspension for the rear of the vehicle, we have shown in Fig. 2 a conventional rear axle 20 for driving a rear ground wheel 21 at each side of the vehicle, the body and frame being sprung at each side by a leaf spring assembly 22 having conventional shackle connections to the frame at 23 and 24. The axle is secured at 25 to the spring assembly. In this instance our shock absorber is connected with studs and rubber bushings generally as in Fig. 1. However, the eye 16 is connected at 25a at the juncture of the spring and axle and the eye 15 is connected at 25b to a side rail portion 25c of the vehicle frame or body so that each shock absorber extends upwardly and forwardly from the rear axle and spring juncture to the vehicle frame. In the illustrated arrangement approximately 1.41" of vertical wheel travel produces 1" of shock absorber movement.

Inasmuch as the illustrated front and rear suspension systems and shock absorber installations give rise to different maximum strokes of the front shock absorbers relative to the rear shock absorbers, each front shock absorber is constructed to afford about a 4" stroke maximum and each rear shock absorber about a 7½" stroke maximum, some additional stroke movement being possible as a protection against breakage of its parts but not ordinarily experienced owing to conventional bumper pads 25d which limit wheel travel proportionately to the maximum shock absorber strokes. In order to accommodate these relatively differing maximum strokes the front and rear shock absorbers are of differing lengths, the collapsed lengths from the eye centers being about $8\frac{11}{16}$" and $12\frac{7}{16}$" for the front and rear shock absorbers respectively, and the fully extended lengths being about $13\frac{1}{16}$" and $20\frac{1}{16}$" for the front and rear shock absorbers respectively.

We have illustrated the principles of our shock absorber in Figs. 3 and 6, Fig. 6 differing from Fig. 3 only by the omission of the Fig. 3 valving control which functions only during the compression or jounce stroke of the shock absorber to reduce the resistance developed by the shock absorber. Otherwise these embodiments are similar to each other and, for the most part, the description will be directed in detail to the Fig. 3 shock absorber as this will serve to also describe the Fig. 6 shock absorber except for such differences in structure and function as will be set forth herein. Where the compression relief valving control is not employed then the Fig. 3 shock absorber will employ the Fig. 6 piston, other parts of the shock absorber being identical in either instance. In order to avoid unnecessary duplication we have shown in Fig. 6 only the modified piston which may in such instance be substituted for the piston in Fig. 3.

In Fig. 3 we have shown the principles of our invention embodied in a shock absorber C of the direct acting telescopic type capable of attachment at its eyes 15 and 16 directly to relatively movable parts for effecting the desired damping action. This shock absorber comprises an upper body member 26 having an axial bore 27 through which the working piston rod 28 is slidably fitted, the latter mounting the eye 15 at its upper end. Adjacent this eye the rod 28 is shouldered to receive the centrally apertured stamped end cover 29, the eye, rod, and cover being structurally united by a weld 30.

Depending from the body 26 in spaced relation with rod 28 is a tubular working cylinder 31 having its upper end press fitting the shouldered cylindrical portion 32 of body 26. The body 26 has a spherical portion 33 fitting within the spherical cap member 34 welded to the upper end of the outer tubular cylinder 35 which is radially spaced from cylinder 31 to provide a reservoir D for the working fluid of the shock absorber. Any of the well-known commercial or other suitable shock absorber fluids may be used as the working fluid in our shock absorber.

The end cap member 34 is centrally apertured to slidably receive rod 28 with clearance and forms a secure assembly of tubes 31, 35 with the body 26. Escape of fluid is prevented by the oil-resistant flexible seal ring 36 seated within cap member 34 and fitting around rod 28, a compression coil spring 37 urging the seal ring into contact with the rod and cap member to prevent escape of fluid outwardly between the rod and cap, as more particularly described and claimed in the copending application of Fred Glassford, Serial No. 139,218, filed January 18, 1950. A tubular dirt shield 38 depends from the end cover 29 spaced outwardly from cylinder 35 to guard against mud and dirt being thrown against the upper end parts of the shock absorber, particularly the rod 28 and parts bounding the space between cover 29 and cap member 34. Any liquid passing upwardly between rod 28 and bore 27 is trapped beneath seal 36 and returns to reservoir D by the grooved passage 39 in the outer face of portion 33.

At the opposite or bottom end of the shock absorber the cylinder 35 has its end portion tightly fitted around the upper end portion of the bottom cap member 40 and welded thereto at 41 to maintain a structurally unitary fluid tight fit. The eye 16 is connected by weld 42 with the outer bottom closed face of the cap member 40. This cap has three relatively spaced regions of inward deflection as at 43 providing three relatively unrestricted passages for fluid within the cap member between the regions 43 as at 44. The cap member at regions 43 is formed to present a downwardly and inwardly sloping wall to seat a similarly faced annular flange 45 of an annular base valve carrier 46 which is stepped annularly at 47 to pilot and seat the bottom end portion of cylinder 31. It will be apparent that with the parts assembled as thus far described at the top and bottom of the shock absorber, the parts at the upper and lower end regions of the shock absorber will be maintained in assembled relation as shown.

The inner end of the piston rod 28 is reduced at 48 to receive a working piston E which is secured to the piston shoulder 49 thus formed by a fastener 50 threaded on the rod end 48. In Fig. 3 valve means of suitable form such as one or more spring valves are clamped in position between shoulder 49 and the upper face of piston E. In the illustrated embodiment this valve means generally designated at V comprises two thin spring steel washer valve members 51, 52 each having an opening for receiving rod portion 48. In the illustrated shock absorber these valve members were made .010 inch thick. The upper face of the piston is provided with an upwardly open annular groove 53 of relatively large capacity for unrestricted fluid flow around the groove. This groove is spaced laterally outwardly of the rod portion 48 to provide a land 54 on which the inner annular portion of valve member 51 is seated, the outer annular portion of this valve member overlying groove 53 and yieldingly preventing liquid escape from the groove. The rod shoulder 49 overlies a substantial portion of the groove providing support for valve members 51 and 52 leaving only the portions of these valve members which extend laterally beyond shoulder 49 for flexing as will be presently more apparent. While the valve members may, if desired, be subjected to pre-load when assembled, we prefer for uniformity under manufacturing conditions to clamp the valve members in position such that member 51 is located flush with land 54, flexing of this valve member being resisted by its spring-like character assisted by the valve member 52. Extending through the piston head 55, preferably on axes parallel to the piston axis for convenience of manufacture, are a plurality of relatively large capacity cored liquid conducting passages 56, shown as three in number equally spaced around the piston head, for unrestricted fluid flow therethrough, these passages opening upwardly to the groove 53 and downwardly to the space below the piston.

In Fig. 6 our modified piston E', which may be substituted for piston E, is identical to piston E except that the passages 56, groove 53, and valving V are omitted, in which instance the rod shoulder 49 directly engages the upper face of piston E'.

The piston E has a sliding fit within cylinder 31 and serves to divide the working space within this cylinder into two chambers bounded by the opposite working faces of the piston. The chamber F above the piston is the rebound chamber and is defined by the volume bounded by the inner walls of cylinder 31, the inner surface of body 26, and the upper face of piston E or such parts as are exposed to the fluid. The chamber F is, of course, defined by its cross-sectional area which is the cross-sectional area of the interior of cylinder 31 less the cross-sectional area of piston rod 28 and the change in volume of chamber F, as piston E moves, is the product of this cross-sectional area of chamber F times the distance through which the piston moves.

The other of the two chambers defined by piston E comprises the jounce or compression chamber G defined by the volume bounded below piston E, cylinder 31, and the upper surfaces of valve carrier 46 and valve parts carried thereby, and more particularly hereinafter described. The chamber G is, of course, defined by its cross-sectional area which is the cross-sectional area of the interior of cylinder 31 and the change in volume of chamber G, as piston E moves, is the product of this cross-sectional area of chamber G times the distance through which the piston moves.

In the particular shock absorber illustrated in Fig. 3 the diameter of the piston rod 28 is approximately ½" and that of the bore of cylinder 31, and hence the approximate diameter of piston E, is substantially 1". These dimensions are, of course, arbitrarily selected and are set forth merely by way of example for the size and capacity of shock absorber which we have employed for the illustrated types of motor vehicle suspensions. These particular whole number dimensions are also of assistance for convenience of reference and discussion in illustrating the principles of our invention. For example, the ratio of cross-sectional areas of chambers G and F is 4 to 3 and as piston E moves, the chambers G and F vary in volume in this same ratio for a given piston movement.

As thus far described, it will be apparent that on compression or jounce, occasioned by a wheel striking a bump in the road, the shock absorber eyes 15 and 16 will move relatively toward each other accompanied by yieldingly loading the suspension spring 14 or 22, as the case may be, in addition to its static load. On rebound, as when the wheel recovers from its jounce movement and when a wheel falls away from the level into a hollow in the road owing to its own weight and that of its associated parts along with the force of its associated suspension spring, the eyes 15 and 16 will move relatively away from each other. Moving with the eye 15 are the piston rod 28 and parts attached thereto including piston E, cover 29, and shield 38. The remaining parts move with the eye 16. For convenience of reference in our specification and claims, we shall refer in most instances to this relative movement as movement of piston E, it being apparent that the shock absorber action occasioned by relative movement between cylinder 31 and piston E may be regarded as though cylinder 31 was fixed and all movement took place at eye 15 and piston E.

With our shock absorber providing rapid damping of oscillations with improved efficiency and better comfort to the passengers it is not necessary or desirable to provide for quick build-up of peaking resistance in either of the compression or the rebound strokes as is common practice with conventional shock absorbers. Conventional shock absorbers rely on damping action over a relatively large number of oscillations or cycles between the sprung and unsprung masses attended by and, in fact in large measure caused by, an insufficient amount of work done by the shock absorber for each of its strokes. Conventional shock absorbers operate with this undesirable characteristic since, among other things, the resistance must be kept fairly low to be reasonably effective for high piston velocity short strokes with the result that there is inadequate resistance provided for low piston velocity long strokes. Even with modern compromises the resistance in conventional shock absorbers is too great for short strokes and insufficient for long strokes and harshness and jolting is experienced for almost all ranges of operations. Furthermore, conventional shock absorbers do not damp oscillations quickly enough so that on rough roads amplitudes build up unduly thereby limiting vehicle safe driving speeds and failing to provide the desired degree of passenger comfort.

In contrast with conventional shock absorbers, we have provided a method and apparatus, presently more apparent, which overcomes the aforesaid disadvantages and undesirable characteristics. Our shock absorber operates by utilizing control passages for friction flow of viscous fluids, such passages being of such length, cross-sectional area, and number so that within the range of piston velocities experienced in automotive practice, the resistance developed by the shock absorber varies proportionately with piston velocity as may be desired, the resistance being free from abrupt changes throughout the piston stroke, and the pressures developed in the compression chamber G being utilized with improved efficiency in providing added resistance relative to pressure and resistance relationships in conventional shock absorbers.

In carrying out the objects of our invention, we provide a simple and effective form of shuttle passage means for restricted flow of fluid between chambers F and G when the piston E moves in each direction of its reciprocatory stroke. Such shuttle passage means maintains these chambers in communication with each other free from valve-controlled fluid flow therethrough at all times so that the liquid flow resistance inherent by the size, shape, and number of passages constituting such passage means provides the total resistance to fluid flow through such passage means. The fluid is thus shuttled back and forth for two-way liquid flow through the open ends of the shuttle passage means in passing from one side of the piston E to the other side.

Apart from the outlet and inlet from and to chamber F provided by the shuttle passage means, the chamber F is otherwise closed during rebound with either the Fig. 3 or Fig. 6 arrangements and also during compression with the Fig. 6 arrangement. With the Fig. 3 arrangement resistance is relieved by the valve means V during compression when the piston velocity is relatively high. However, because of the differential in volume change between chambers F and G occasioned by piston rod 28 disposed in chamber F, provision is made to accommodate escape of fluid displaced by rod 28 into reservoir D during the compression stroke and to accommodate unrestricted return of such fluid from the reservoir to chamber G on the rebound stroke to insure against cavitation developing in chamber G.

In the present embodiment of our invention, the shuttle passage means H comprises a plurality of fluid conducting conduits or passages 57 drilled through the piston head 55 such that each passage has one of its ends open to chamber F at all times and its other end open at all times to chamber G. Each passage 57 is preferably of uniform cross-sectional area presenting smooth boundary walls and preferably extends parallel to the axis of piston E and rod 28. This shuttle passage means H comprising passages 57 are of such number, length, and cross-sectional area to provide the desired fluid flow resistance as will presently be more apparent.

Chamber G is provided with restrictive fluid flow means for controlling fluid flow from this chamber into the reservoir D. This flow means, according to the present illustrative embodiment of our invention, comprises a jounce or compression chamber escape passage means illustrated in the form of an escape passage J. This compression chamber escape means may be formed of a plurality of passages of suitable total cross-sectional area and length but preferably comprises a single escape passage J formed by drilling through a brass plug 58, the plug and passage being shown coaxial with piston E and cylinder 31 but may be otherwise disposed if desired. A single passage is desirable from a manufacturing standpoint in order to avoid having to drill passages of lesser diameter than required by using a single passage. Use of very small drills is undesirable. This passage J is, therefore, preferably of uniform cross-sectional area free from bends or irregularities and when drilled may have a slight counterbore 59 at one end to center the drill and also at the other end at 60 formed when the drill burr is removed. The plug 58 is formed with an enlarged frusto-conical portion 61 at the end thereof within chamber G. This portion 61 presents a deflecting surface which is flared outwardly from the upper end of passage J and longitudinally thereof so as to deflect dirt, chips or the like away from passage J. Below the portion 61 the plug has a portion 62 of reduced diameter press-fitted within an opening of a plate check valve 63, the plug shoulder 64 engaging the upper face of the valve. The plug 58 and valve 63 thus form a unit assembly and may, if desired, be formed from a solid piece of metal, preferably brass for ease of drilling the passage J.

The check valve 63 is lightly yieldingly urged by a spring 65 on the upstanding shouldered seat 66 bounding the unrestricted passage 67 formed in valve body 46 concentrically arranged with the axis of passage J. Spring 65 is secured in body 46 by peening the annular edge of body portion 47 so as to overlie the annular margin of spring 65 as shown at 68, the spring having spring fingers 69 engaging the upper face of valve 63.

The passage J has its opposite or lower end open into the reservoir D at a point arranged so that it will not direct a stream of fluid from passage J toward the air space in reservoir D above the level of fluid therein since to do so would froth the fluid and undesirably entrain air particles.

Thus the passage J has its discharge end adjacent the bottom of passage 67 for directing a a fluid stream into the reservoir chamber 70 disposed between body 46 and the end member 43, the stream being directed downwardly into this chamber 70 which communicates freely with the main annular reservoir D by the passages 44. A spiral baffle member 71 is disposed in reservoir D to prevent liquid in the reservoir from unduly surging and frothing or commingling with the air above the reservoir.

During the compression stroke of piston E when the latter moves toward valve carrier 46, valve 63 will remain seated and prevent any escape of fluid from chamber G to reservoir D, all such fluid displaced by the piston being compelled to flow through the compression chamber escape means J to reservoir D and to chamber F. This fluid flow to chamber F takes place in Fig. 3 and Fig. 6 through the shuttle passage means H supplemented in Fig. 3 by slight flow through passages 56, groove 53, and valve V at the higher piston compression velocities. However, on rebound, upward movement of piston E has a suction effect on valve 63 and since this valve is only lightly held to its seat it readily unseats carrying with it the plug 58 and freely admits fluid from reservoir D to chamber G so as to maintain chamber G filled with fluid during rebound after which valve 63 again seats by spring 65.

Our shuttle passage means H is so proportioned in respect to the length, number, and cross-sectional area of the passages 57 as to provide the desired damping in predetermined relationship with the compression escape means J which is likewise proportioned to obtain the desired damping effect. When these parts are proportioned in relationship with one another according to our invention, improved damping control is obtained for both long and short stroke rebounds and compressions. Furthermore, the rebound chamber F will be filled at all times and free of cavitation which would undesirably alter the desired resistance on rebound.

In contrast with the aforesaid conventional type of shock absorbers, our device has its fluid control parts so proportioned and arranged as to take advantage of what we call a full displacement principle during compression and particularly during the first part of the compression stroke where lag in resistance build-up is particularly troublesome. During operation of the vehicle the bouncing action at the shock absorber tends to emulsify the working fluid by entraining air bubbles in the liquid with the result that their is a tendency to lose shock absorber action, commonly called "fading." This lag effect is the result of the piston taking up lost motion incident to aeration of the fluid and in taking up the lag the effect of harshness is frequently objectionably apparent. Our shock absorber is so constructed that substantially the full area of the piston is effective on compression strokes for developing shock absorber resistance, especially in the range of lower piston velocities and particularly at the start of the compression stroke. Utilization of the full piston area for fluid pressure in the compression chamber is known as the full displacement principle on compression. The efficiency of the full displacement principle increases in proportion to approach to atmospheric pressure on the low pressure side of the piston. This is in contrast with more conventional arrangements wherein pressures in the rebound chamber are equalized with pressures in the compression chamber during compression strokes, it being apparent that in such types of shock absorbers the effective area of the piston in developing shock absorber resistance is only that area which is equal to the cross-sectional area of the piston rod, the pressure on the remaining piston area being balanced out. In the illustrated arrangement of suspension tendency to fade is more pronounced with front shock absorbers than with the rear shock absorbers.

By way of one specific example of carrying out our invention, we have obtained good results in keeping with the objects of our invention by employing shuttle passage means H for our front shock absorbers in the form of three passages 57 equally circumferentially spaced as shown in Fig. 4, each of these passages being .032" in diameter and .207" long. Each of the three unrestricted passages 56, when used as in Fig. 3, was made .093" in diameter, this diameter and the length of such passages not being particularly significant as long as these dimensions are maintained so as not to provide substantial resistance to fluid flow therethrough which, as will be presently apparent, is very slight. Our compression chamber escape means J for our front shock absorber was made by drilling a passage ⅜" in length and .032 inch in diameter as illustrated in Fig. 3. In the Fig. 6 modification the only difference over Fig. 3 resides in the omission of the Fig. 3 valve means V and its associated groove 53 and passages 56.

The capacity of the compression escape means J bears a cooperating relationship to that of the shuttle passage means H in determining the functioning characteristics of the shock absorber. In our shock absorber this relationship is such that progressively smooth resistance is built up on compression and rebound strokes while maintaining the rebound chamber F filled at all times so as to avoid cavitation. Inasmuch as the effects of fade are more noticeable in front shock absorbers than in rear shock absorbers and since the front shock absorbers are called on to perform more work per inch of stroke than the rear shock absorbers, and also because of other factors including desirability to provide rebound resistance in the front shock absorbers in an amount as high as practical in closely approaching the amount of compression resistance provided by the front shock absorbers, our front shock absorber represents somewhat more closely than our rear shock absorber the optimum efficiency in developing both rebound and compression resistance, but especially rebound resistance. Such optimum characteristics contain as one desirable factor the predetermined relationship between the total areas of the shuttle passage means H effective on rebound and that of the compression escape means J as related to the volumes of liquid displaced on rebound and compression. Such relationship for the same given stroke on compression and rebound may be expressed in the following terms for our illustrated arrangement of shock absorber parts:

$A^1$ is the total area of the shuttle passage means H effective during rebound, $A^2$ is the total area of the compression escape means J, $A^3$ is the cross-sectional area of the chamber F which is for all practical purposes equal to the cross-sectional area of the piston E less the cross-sectional area of piston rod 28, and $A^4$ is the cross-sectional area of piston rod 28. Employing such terms, then $$\frac{A^1}{A^2} = \frac{A^3}{A^4}$$

In our front shock absorber this ratio is substantially 3 to 1, it being understood that slight variance may be tolerated as it is ordinarily neither practical nor necessary to maintain an absolutely fluid tight fit between piston E and cylinder 31 and between rod 28 and head 29. Slight leakages at such points have only slight effect on the theoretical and practical performance of our shock absorber but we have found that in striving for optimum performance from the aforesaid standpoints we have been able to successfully operate front shock absorbers according to the objects of our invention wherein the ratio $$\frac{A^1}{A^2}$$

is slightly less than $$\frac{A^3}{A^4}$$

by approximately 6%, the apparent deficiency in the ratio $$\frac{A^1}{A^2}$$

being accounted for by slight leakage past the piston E which to this slight extent supplements the shuttle passage means H. Generally speaking, our preferred practice in proportioning our shock absorber for the aforesaid optimum results where desired as in our illustrated front shock absorber for example is to so arrange and proportion the parts that $$\frac{A^1}{A^2}$$

is substantially equal to $$\frac{A^3}{A^4}$$

Our Fig. 3 shock absorber is so proportioned in deviating from this relationship, when desired, care should be observed that $$\frac{A^1}{A^2}$$

does not fall substantially below $$\frac{A^3}{A^4}$$

as deviation in this direction tends toward undesired cavitation in chamber F, it being understood that slight deviation as aforesaid in this direction may be tolerated even without cavitation in chamber F largely because of customary small leakage past piston E. This small leakage, from practical manufacturing viewpoints, is tolerated and since it is present it permits the ratio $$\frac{A^1}{A^2}$$

slightly less than $$\frac{A^3}{A^4}$$

and our aforesaid deviation of about 6% in this direction represents what we consider the practical limit where leakage past the piston is not encouraged by deliberate design in the fit between the piston E and cylinder 31, this fit in our shock absorber being the customary good sliding fit designed to minimize leakage.

Where it is not desired to strive for the general maximum in rebound resistance as an effort to equalize the same with the compression resistance $$\frac{A^1}{A^2}$$

may be safely increased as desired in relation to $$\frac{A^3}{A^4}$$

as such deviation from equality in this direction does not tend toward cavitation in chamber F but does proportionately to the extent of such deviation reduce the otherwise obtainable rebound and compression resistance and especially does such deviation penalize available rebound resistance.

Because of the longer wheel travel per inch of shock absorber piston movement in the vehicle installation given herein by way of example for the front shock absorbers as compared with the relatively lesser wheel travel per inch of piston movement for the rear shock absorbers, it is desirable to provide somewhat higher resistance by the front shock absorbers than for the rear shock absorbers thereby compensating for the lesser effective leverage action at the front shock absorbers. Furthermore, in many types of suspension, static friction, load, wheel base, and spring rates by way of example may be different at the front and rear of the vehicle making it desirable to proportion the damping effect of the front and rear shock absorbers to compensate for such differences. Therefore, with the foregoing considerations in view, we provide each of our rear shock absorbers with shuttle passage means H comprising four passages each .039" in diameter instead of .032" for the front shock absorber. These four passages are of the same length as the passages 57 and are likewise equally spaced around the piston of the rear shock absorber. When employed, the valving V and the three cored passages 56 and groove 53 are just as shown in Fig. 3 for the front and rear shock absorbers. Our rear shock absorber has the same check valve 63 and escape passage means J and associated parts as shown in Fig. 3 for the front shock absorber except that the passage J is .042" in diameter instead of .032" for the front shock absorber. The length of passage J is the same as for the front shock absorber, namely ⅜".

We desire to point out that during compression the shuttle passage means H through piston E between chambers G and F is responsible for most of the resistance work or damping developed by our shock absorber, the compression chamber escape means J being responsible for a lesser amount. In the example chosen for illustrative purposes wherein the areas of the piston E and rod 28 are in the ratio of 4 to 1, the shuttle passage means H is responsible for up to as much as nearly 75% of the total compression resistance work as it handles substantially three times as much fluid as passage J which, of course, must pass the fluid displaced by rod 28 into the reservoir chamber D. By effecting such relatively great amounts of resistance work in the shuttle means H which is confined within cylinder 31 the fluid is much more rapidly heated in the working chambers F and G and the shock absorber reaches its average normal working temperature condition much more rapidly than with conventional shock absorbers operating under comparable conditions. By our method of damping we effect more energy absorption at a given fluid pressure than heretofore, most of the energy absorption being effected through the shuttle passage means which is self-contained within cylinder 31. Our compression escape means J is so proportioned in relation to the shuttle passage means H that the flow means J will provide a rate of discharge into reservoir D at any pressure developed in the compression chamber G under varying piston velocities such that at any given piston velocity the shuttle viscous flow means H will pass slightly more fluid in proportion to the displacement of the piston area less the rod area than the passage means J will pass in proportion to the displacement of the piston rod area alone, the excess insuring against cavitation in the rebound chamber F.

As will be apparent from Fig. 3 chamber F is closed except for the communication with the open ends of the passages 57 and by passages 56 when permitted by valve V, these passages 57 unrestrictedly communicating freely with chamber F. In our Fig. 6 embodiment chamber F is closed except for the passages 57. Any fluid which may work past rod 28 will drain from the chamber containing spring 37 down through passage 39 in member 26 and into reservoir D. Chamber G, except for check valve 63 which is closed during jounce, is likewise closed except for the communication with the opposite ends of passages 57 and 56 and with one end of passage J, these passage ends communicating unrestrictedly with chamber G. In Fig. 6 passages 56 are omitted. On rebound, check valve 63 freely admits fluid from reservoir D to chamber G in quantity largely replacing that ejected through passage J on compression, it being apparent that the resistance to fluid flow through passage J will not permit substantial back flow through this passage on rebound.

Figure 7:
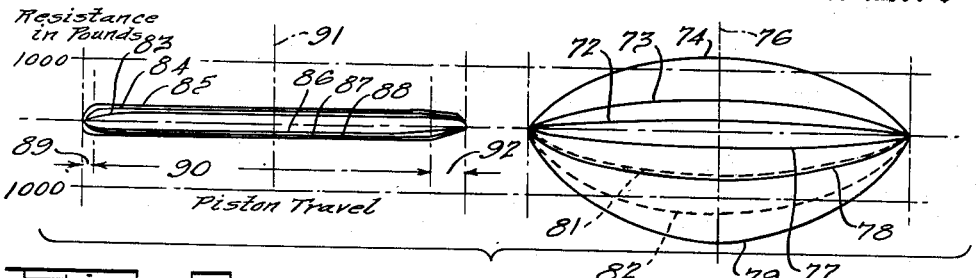
Fig. 7 is a diagrammatic illustration of typical performance characteristic of our shock absorber related to performance of the aforesaid conventional shock absorber.
Figure 8:
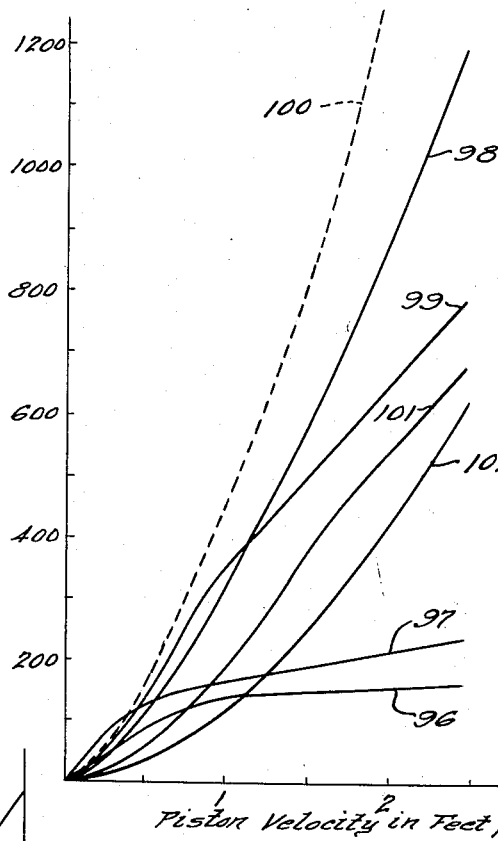
Fig. 8 is a diagrammatic illustration of resistance-velocity characteristic of our shock absorber related to the aforesaid conventional shock absorber.

Referring to Figs. 7 and 8, we have somewhat diagrammatically illustrated certain typical performances of our shock absorber and our novel damping principles in contrast with typical conventional performance characteristics.

In Fig. 7, we have illustrated typical rebound resistance curves 72, 73, and 74 developed by machine operation of our Fig. 3 front shock absorber, resistance being plotted against piston travel, the machine being of the well known type employed in shock absorber tests in which the piston is moved relative to its cylinder with approximately simple harmonic motion derived by connecting a rotating crank with the shock absorber piston rod. These curves 72, 73, and 74 illustrate forced resistances developed by our shock absorber during operation of the test machine for a 3" typical stroke for 55, 100, and 200 R. P. M. or cycles per minute respectively and substantially duplicate actual performance of the shock absorber on the vehicle for variations in conditions between mild and severe compressions and rebounds. In each instance the resistance builds up smoothly under fluid damping to a maximum at piston mid-stroke regardless of maximum piston velocities indicated at 76 and then falls off smoothly under fluid damping to zero as the piston reaches the end of its rebound stroke. It will be noted that the resistance build-up portion of each curve up to the piston mid-stroke at 76 is similar to the remaining half of the curve when the resistance diminishes from the piston mid-stroke to the end of the stroke. The rebound curves 72, 73, and 74 are also typical of performance of our Fig. 6 shock absorber without valve V as this valve in Fig. 3 does not affect rebound performance.

The compression resistance curves companion to and completing the cycle of rebound curves 72, 73, and 74 are shown in Fig. 7 at 77, 78, and 79 for our front shock absorber of our Fig. 6 type without valving V and associated passages 56 while the companion curves for our Fig. 3 front shock absorber with valving V are shown at 77, 81, and 82. It will be observed that there is no appreciable difference in compression resistance at 55 cycles per minute with either the Fig. 3 or the Fig. 6 arrangement and, in fact, very little difference at 100 cycles per minute but as the cycles per minute increase, with proportionate increase in piston velocity, the compression resistance falls off at an accelerated rate relative to increases in compression resistance for the Fig. 6 arrangement. It will be noted that with our Fig. 3 arrangement the compression curves 77, 81, and 82 are substantially similar to the rebound curves 72, 73, 74 and is made possible by the valve V which so controls compression resistances, especially in the range of maximum piston velocity at 76 where peak resistances are developed, as to limit these resistances in comparison with their values with the Fig. 6 arrangement according to curves 77, 78, and 79.

We have obtained good results with our Fig. 6 arrangement but we have found that resistances developed on compression, especially for extreme wheel jounce movements produce resistances which cause failure in mounting studs which are conventionally employed. Although these studs and parts mounting them can, of course, be made of such size and strength to prevent failure, we nevertheless prefer in most types of passenger car installations to reduce these peak resistances and our Fig. 3 arrangement accomplishes this control. Before describing the functions of valve V in further detail we will, by way of contrast, refer to more conventional "blow-off" valves of conventional shock absorbers.

In Fig. 7 we have illustrated typical performance rebound curves 83, 84, 85 and compression curves 86, 87, 88 for a conventional shock absorber referred to herein as being of the "blow-off" type in which fluid pressure in both the jounce and rebound chambers builds up rapidly, then abruptly flattens off with only slight build-up for nearly all of the piston stroke, and then abruptly falls off. These curves illustrate the same conditions of operation and for the same size shock absorber as for our Fig. 7 characteristics, the scale being the same. Thus the Fig. 7 conventional characteristic curves could be superimposed for comparative marked contrast but for clarity they are shown adjacent each other where comparison may be conveniently made.

In Fig. 7 for each of the widely varying piston velocities as determined by the test machine crank operation at 55, 100, and 200 R. P. M. corresponding to rebound resistance curves 83, 84, and 85 respectively and compression resistance curves 86, 87, and 88 respectively, it will be apparent that the curves are very close to each other and that peak resistances developed are nearly the same in spite of the wide variation in piston velocity. Thus in each instance resistance rapidly builds up over the very short initial portion of the piston stroke 89 at which time the conventional blow-off relief valve opens to prevent further substantial pressure rise. This results in an abrupt objectional change in the rate of resistance increase, the resistance at blow-off being generally maintained through nearly the entire piston stroke as indicated by the stroke portion 90. The slight resistance rise to the mid-point 91 during the stroke portion 90 is largely the result of slight added resistance to fluid flow through the blow-off valve. Then, as the piston velocity approaches rest at the end of its stroke with resulting diminution of fluid pressure on the piston the blow-off valve closes abruptly and the resistance rapidly falls off to zero during the small portion of the terminal piston stroke as at 92. The compression characteristics 86, 87, and 88 for this conventional type of shock absorber are substantially the same as the rebound curves 83, 84, and 85.

Returning now to the valve V of Fig. 3, this valve is not a blow-off valve and it is not a pressure relief valve such as have heretofore been common in prior shock absorbers. The performance curves 83 to 88 of Fig. 7 illustrate the functioning of conventional shock absorbers on both compression and rebound wherein pressure in both the compression and the rebound chambers is prevented from rising substantially above a predetermined amount virtually regardless of increase in piston velocity, the conventional valving functioning to relieve pressures in each chamber in excess of such amount. In contrast with such conventional performance, our valve does not appreciably relieve any fluid pressure in the compression chamber although it does function to relieve resistance which would otherwise develop on compression especially in the range of relatively high piston velocities. Our passages H and J are so proportioned relative to each other and with respect to the fluid displacements defined by the cylinder 31, piston E, and rod 28, that the rebound chamber F will be maintained filled during compression strokes irrespective of valve V. For example, our Fig. 6 shock absorber functions to maintain the rebound chamber filled through only the shuttle passage means H. Consequently the addition of valve V in Fig. 3 over Fig. 6 does not result in passing any more fluid, in practical measurable quantity, from chamber G to chamber F than would take place in Fig. 6 without valve V. Since chamber F is maintained filled on compression without valve V then obviously additional fluid of a practically incompressible nature cannot be admitted to the already full chamber. It may well be that at higher piston velocities a small amount of fluid may flow past valve V during compression but such flow as may take place is diverted from passages 57 due to the decrease in pressure drop across passages 57 as the pressure in chamber F rises under control of valve V, the total flow from chamber G to chamber F being approximately the same in Figs. 3 and 6 at any given piston velocity. The displacement of the piston E is so large in proportion to minutely small quantities of fluid necessary to raise the pressure in chamber F during compression strokes, particularly at the higher piston velocities, that, as aforesaid, the amount of fluid passed by valve V over and above what passages 57 will pass without valve V at a given piston velocity on compression is small but sufficient to alter the pressure differential across the piston. The effect of the valve means V is to increase the capacity of the passages 57 under conditions of relatively high piston velocity. If desired the physical characteristics of valve V may be altered to increase this capacity over that illustrated herein in order to lessen compression resistance.

Our flat spring steel disks 51, 52 constituting valving V function to progressively increase the pressure in chamber F, on compression, such pressure increase in Fig. 3, in comparison with our Fig. 6 arrangement, being negligible for relatively low piston velocities but building up at an accelerated rate as piston velocities increase over the relatively high range of piston velocities where reduction of peak resistance forces is desirable.

With both the Fig. 3 and Fig. 6 shock absorbers substantially the full piston area is effective to develop compression resistance up to around 50 or 55 cycles per minute of shock absorber operation. In other words, in this range of operation the fluid pressure in the compression chamber, on compression, acts against the full piston area in developing compression resistance. As the cycles increase with corresponding increase in piston velocity, valve V in Fig. 3 functions to progressively allow pressure to build up in the rebound chamber F during compression strokes, with very little rate of build up at first but rapidly accelerating in rate of build up as piston velocities approach 200 cycles of operation and above. When pressure in the rebound chamber increases above atmospheric, only the difference in pressure in chambers G and F is effective on the area of the piston less that of the piston rod, it being apparent that the pressure in chamber G is furthermore always effective in developing compression resistance by acting on an area of the piston equal to that of the rod 28, so that by building up the pressure in the rebound chamber the total resistance on compression can be controlled and diminished by valve V. Therefore, while our valve V does not at any time equalize the pressure in chambers G and F it does trend in this direction especially when the compression strokes become extreme.

During compression strokes of the shock absorber the resistance developed is determined by the differential of pressures in chambers F and G. Thus the compression resistance is the pressure of the liquid in the compression chamber G times the cross-sectional area of the piston E less the pressure of the liquid in the rebound chamber times that portion of the piston area that bounds this chamber, i. e., the cross-sectional area of the piston less that of the rod 28. When the pressure of the liquid in the rebound chamber is at atmospheric then the resistance is the product of the compression chamber pressure times the piston area. As the pressure of the liquid in the rebound chamber increases it will be apparent that the resistance, based on the aforesaid pressure differential, will be less than the product of the compression chamber area times the piston area but at any time in the compression stroke there will be some portion or per cent of the full piston area which, when multiplied by the compression chamber pressure, will equal the resistance developed at such time and for convenience of reference we have referred to such portion or per cent as the "effective" piston area. For example, when the pressure of the liquid in the rebound chamber is at atmospheric then the full piston area is effectively acted on by the pressure of the liquid in the compression chamber in producing compression resistance. If the liquid pressures were equal in chambers F and G, as is customary in conventional shock absorbers acting on compression, then the effective piston area would be that portion which is equal to the cross-sectional area of rod 28 and the compression resistance would be equal to the product of this area times the pressure of the liquid in the compression chamber. Thus, for any given liquid pressure in the compression chamber, the effective piston area for compression resistance will decrease from the full piston area as pressure of the liquid in the rebound chamber increases. In our shock absorber we have provided a novel method of controlling liquid flow on compression strokes and a novel construction for liquid flow control whereby as piston velocities increase toward values which would result in undesirably high compression resistances, such resistances are kept within desirable limits by utilizing the compression chamber pressures to increase the rebound chamber pressures thus diminishing the portions of the piston area which are effectively acted on by the pressure of the liquid in the compression chamber, the rate of such increase being accelerated as the piston velocities approach their maximum values under conditions encountered by whatever use to which our shock absorber is put. Therefore, while our references herein to the effective piston area relationship with compression chamber pressure offers a convenient manner of expressing compression resistance characteristics of our shock absorber, this relationship is actually but a computed equivalent, for convenience of reference, of the more involved differential pressure expressed above in terms of liquid pressures in the compression chamber G and in the rebound chamber F along with their respectively related cross-sectional areas of the piston and the piston minus the rod.

For a typical 3" stroke of our front shock absorber on the test machine, operation at 50 cycles per minute provides a maximum piston velocity of .65 feet per second, 55 cycles providing a velocity of .715, such operations corresponding generally to ordinary conditions of vehicle travel over fairly good roads somewhat less smooth than are ordinarily encountered in cities and towns. Operation on the machine at 100 cycles per minute produces 1.315 maximum piston velocity and corresponds approximately to vehicle travel over average moderately rough roads and at 200 cycles, producing 2.63 maximum piston velocity, there is fair equivalency to what may be termed very rough roads. Under extreme conditions a piston velocity as high as 4 feet per second has been experienced. These equivalencies are only general as opinions vary as to classification of degrees of road roughness but will nevertheless serve to generally correlate the functional data given herein for our shock absorber with vehicle ride characteristics and to demonstrate the value of machine test data.

Figure 9:
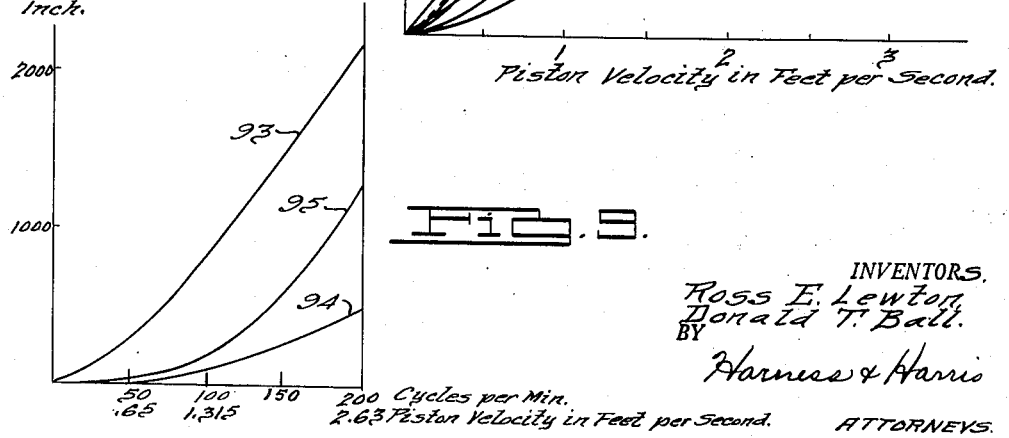
Fig. 9 is a diagrammatic illustration of performance characteristics of our Fig. 3 and Fig. 6 shock absorbers, fluid pressure in the compression and rebound chambers being plotted against cycles per minute of shock absorber operation or maximum piston velocity at such cycles.

The function of our valve V as a resistance relief valve by controlling the amount of piston area effective in developing compression resistance as distinct from conventional pressure relief valving is an important characteristic of our Fig. 3 shock absorbers. In Fig. 9, for example, we have shown approximate performance of our Fig. 3 and Fig. 6 front shock absorbers operating at a 3" stroke, maximum fluid pressure in pounds per square inch being plotted against cycles per minute or maximum piston velocity in feet per second. In Fig. 9 curve 93 shows generally the maximum pressure in the compression chamber G both without the valve V, as for Fig. 6, and with valve V as for Fig. 3, the valve V having no appreciable effect as aforesaid on fluid pressures developed in chamber G. It is apparent that pressures developed rise at an increasing rate, especially after around 100 cycles per minute and in fact pressures in chamber G have been measured as high as 5000 p. s. i. for extreme piston velocities around 4 feet per second.

With our Fig. 6 front shock absorber the maximum pressure in the rebound chamber F during compression strokes increases above atmospheric pressure moderately after around 50 or 55 cycles, as noted, from curve 94, becoming somewhat more pronounced in the rate of increase as the piston velocity increases. However, while substantially the entire piston area is effectively acted on by the fluid pressure in chamber G during compression strokes up to around 50 to 55 cycles per minute, much of the full displacement principle is effective even at 200 cycles where under the conditions noted substantially more of the piston area is similarly effectively acted on than the area equal to the piston rod. Throughout practically all of the normal range of activity on the vehicle our Fig. 6 front shock absorber and also our Fig. 3 front shock absorber utilize an effective portion of the piston acted on by the fluid pressure in chamber G during compression strokes which effective area is more nearly equal to the full cross-sectional piston area than to the cross-sectional area of the piston rod. This is apparent from Fig. 9, curve 95 indicating the effect of valve V in reducing the effective piston area on compression by building up the fluid pressure in the rebound chamber at a small rate of increase over the Fig. 6 performance between around 50 to 55 cycles and 100 cycles and at an accelerated rate of increase thereafter. In each instance, either with the Fig. 3 or Fig. 6 arrangement, the whole effect of the full displacement principle is available throughout the entire compression stroke of our front shock absorber up to around 50 or 55 cycles per minute, this being of substantial advantage to avoid fading which is a noticeable characteristic of conventional front shock absorbers. Furthermore, the whole effect of full displacement principle is effective during the initial compression stroke over the whole range of performance of our shock absorber, the values indicated by way of example at 94 and 95 in Fig. 9 being maximum pressures attained in the rebound chamber at the instant of maximum piston velocity.

We desire to point out that the values shown in Fig. 9 are approximate owing to extreme difficulty in obtaining accurate data for the illustrated pressures under conditions of shock absorber operation. However, they illustrate approximate conditions and general pressure trends which we have measured on tests.

The effect of the operating principles of our shock absorber on damping resistance developed during compression and rebound strokes in comparison with the aforesaid conventional types of shock absorbers is illustrated in Fig. 8 wherein resistance in pounds is plotted against velocity of the shock absorber piston in feet per second. The resistance characteristic of a conventional front shock absorber is shown at 96 on compression and at 97 on rebound, it being noted that maximum resistances attained are relatively low being around 200 pounds at the maximum.

In contrast, our front shock absorber provides resistances which are much higher both on compression and rebound and which build up smoothly without abruptly rising and leveling off resistances which is characteristic of conventional shock absorbers. The curve 98 illustrates the resistance of our Fig. 3 and Fig. 6 front shock absorber on rebound, 99 illustrating the Fig. 3 resistance on compression, and 100 the Fig. 6 resistance on compression without the Fig. 3 valving V. It will be noted that the fluid damping characteristics provided by our passage means H and J effect, throughout most of the range of normal operation on a vehicle, fluid damping control approaching what may be termed viscous damping in which resistance varies directly proportionately with variation in piston velocity as more fully described and claimed in said Cuskie application.

It will be appreciated that in following the principles of our invention as applied to vehicle suspensions of various types it may be desirable to provide somewhat less resistance at given piston velocities than is provided by our front shock absorber which has been described in considerable detail as representing substantially maximum rebound resistance for the size shock absorber and parts set forth and in keeping with other desired performance characteristics. For example, our rear shock absorber for the illustrated type of suspension in Figs. 2 and 2A is preferably of somewhat less resistance than the front and, when proportioned as aforesaid with respect to passages H and J performs substantially as set forth for the front shock absorber but with lesser resistance.

The resistance developed by our rear shock absorber incorporating valve V as in Fig. 3 is illustrated by curves 101 and 102 representing respectively compression and rebound resistances operating on a 4" stroke. Such performance is obtained by use, as aforesaid, of four passages 57 each .039" in diameter and a compression escape passage J of the aforesaid length of .375" but having a passage diameter of .042" instead of .032". With such arrangement the ratio $$\frac{A^1}{A^2}$$

becomes 3.45 which is slightly greater than the ratio $$\frac{A^3}{A^4}$$

by around 8%. In the shock absorbers which we constructed the ratio $$\frac{A^3}{A^4}$$

was actually 3.19 based on average piston rod diameter of .4887" and average piston diameter of .9977" which, as aforesaid, may be generally taken as ½" and 1" respectively for most all practical purposes.

We have given specific examples of our front and rear shock absorbers in order to illustrate typical arrangements of our parts with typical suspension types from which data variations in the illustrated performance characteristics may be obtained as desired.

The relative proportions of the size, number, and diameter of the passages 57 and J are determinative of the basic performance characteristics of our shock absorber. For example, if the flow resistance of passage J is progressively diminished by enlarging its diameter, for example without changing the passage means H, then the compression resistance will be progressively diminished and there will be a progressive approach toward cavitation in the rebound chamber F. Conversely by progressively increasing the flow resistance of passage J by decreasing its diameter, for example without changing passages 57, then pressures will be progressively higher in chambers F and G on compression at a sacrifice of full displacement principle and compression resistances will tend to be excessively high.

If on the other hand passage J is unchanged and the shuttle passage means is varied to progressively increase or decrease fluid flow resistance therethrough then the desired relative proportioning between passages J and 57 tends to undesirably alter the desired functioning of the shock absorber. For example, by progressively lessening the flow resistance of shuttle passage means H as by enlarging the diameter of passages 57, both rebound and compression resistances will progressively fall off, the pressure in chamber F increasing on compression at a sacrifice to effective utilization of the full piston area or the desired portion thereof. Conversely by progressively increasing the flow resistance of passage means H as by decreasing the diameter of passages 57 for example, there will be proportionate approach to and degree of cavitation in chamber F and also an undesired proportionate increase in rebound and compression resistances.

It will be apparent that simultaneous changes to the shuttle passage means H and to the compression chamber escape means J, as in the size and number of their passages, may be made in proper relationship with each other so as to preserve the desired over-all characteristics taught by our invention and within the scope of our invention.

Sufficient fluid is used in our shock absorber so that with chambers F and G filled, the reservoir D will be about half filled when the shock absorber is fully extended and about two-thirds full when fully collapsed.

From the foregoing it will be apparent that in both our Fig. 3 and our Fig. 6 shock absorbers the pressure in the rebound chamber, during compression strokes, increases gradually up to about half of the illustrated range, this range extending up to 200 cycles of operation per minute corresponding to about 2.6 feet per second piston velocity. Thus up to around about 1.3 a very substantial part of the full displacement principle is effective but over the second half of this range the pressure in the rebound chamber increases at an accelerated rate for constant increments of increase in piston velocity under the conditions noted. One effect of the one-way resistance relief valve V of the resistance controlling liquid passage means of Fig. 3 is to accentuate the rate of increase in the rebound chamber pressure particularly over the second half of the range up to 200 cycles and beyond this normal range where protection to physical parts is most important when experiencing extreme compression strokes with attendant extreme pressures in the compression chamber. At such times the accelerated rate of pressure build-up in the rebound chamber is much higher than that for compression strokes at half such extreme piston velocities and with the Fig. 3 arrangement the rate of build-up is even more pronounced than with the Fig. 6 arrangement.

In the conventional shock absorber the pressure in the rebound chamber practically equals the pressure in the compression chamber during compression strokes because the conventional check valving allows practically unrestricted flow of liquid, when it opens, from the compression chamber to the rebound chamber. This is in contrast with our shock absorber wherein when we refer to pressure in the rebound chamber being substantially below the pressure in the compression chamber we mean substantially below the small pressure drop incident to fluid flow through conventional check valves. Likewise when we refer to the pressure in the rebound chamber not being equal to that in the compression chamber we mean to express such inequality even by adding to the pressure in the rebound chamber the small pressure difference incident to the small pressure drop across conventional check valves.

From what has been said herein for each of the illustrative embodiments of the principles of our invention illustrated in Figs. 3 and 6, it will be apparent that the shuttle passage means H has a predetermined capacity to conduct or flow liquid under pressure therethrough. This liquid flow capacity will, of course, vary as the liquid pressure differential between chambers F and G varies and is determined by the aforesaid size, shape, and number of the passages which constitute the shuttle passage means H. When this has been determined, according to the teachings of our invention, the liquid flow capacity of the shuttle passage means H will thereby be fixed or constant for any given liquid pressure differential and will thereby determine the liquid flow resisting characteristic of the shuttle passage means H in effecting resistance to movement of the shock absorber piston E over its range of velocities incident to normal use of the shock absorber in damping relative movements between the vehicle ground wheel and sprung parts such as the body. Likewise the liquid escape passage means J has a predetermined capacity to conduct or flow liquid therethrough when subjected to a liquid pressure differential between chamber G and the reservoir D and this liquid flow capacity will likewise vary as the pressure differential varies. The liquid flow capacity of the liquid escape means J is likewise determined by the aforesaid size, shape, and number of the passages which constitute the escape passage means J and when this has been determined, according to the teachings of our invention, the liquid flow capacity of the escape passage means J will thereby be fixed or constant for any given liquid pressure differential and will thereby determine the liquid flow characteristic of the escape passage means J in effecting resistance to movement of the shock absorber piston E in the direction of its reciprocatory movement toward the check valve means 63 and over its range of velocities incident to normal use of the shock absorber.

Because of the inherent characteristic of the shuttle passage means H to restrict flow of liquid between chambers F and G, this passage means H may be said to restrict free flow or escape of liquid therethrough between chambers F and G when piston E reciprocates. This is in sharp contrast with the aforementioned conventional shock absorbers having a pressure relief or check valve associated with one or more conventional liquid conducting passages which are of such large liquid flow capacity as to permit or accommodate free flow of liquid therethrough so that when the valve is open the pressure of the liquid in the conventional rebound chamber is deliberately permitted to substantially equalize with the liquid in the conventional compression chamber when the piston stroke is toward the conventional check valve controllingly associated with the liquid reservoir.

The arrangement of compression chamber G and rebound chamber F may be conveniently referred to by designating the chamber G without the piston rod 28 as a "first" chamber and the other as a "second" chamber, and the piston E having a movement in "one direction" which unseats check valve 63 (up in Fig. 3) and a movement in its "other direction" (down in Fig. 3) which seats this check valve.

In each of the embodiments of our invention, in contrast with conventional shock absorbers, the area of the shuttle passage means H is of such predetermined amount, in proportion to the liquid displaced by reciprocatory movement of the piston, as to provide a liquid flow resisting characteristic which will effect all of the resistance to movement of the piston in its said one direction away from the check valve 63, it being noted that this same area and liquid flow resisting characteristic of the shuttle passage means is presented to the liquid in the first chamber G to restrictively control escape of liquid therefrom to the second chamber F during movements of the piston in its other direction. In our front shock absorber in which the shuttle passage means H was comprised of the aforesaid three restricted passages each having a diameter of .032 of an inch, the total area of the shuttle passage means is approximately .00242 square inch and the area of the escape passage means J one-third of such area or approximately .00081 square inch. Thus for the illustrated size of shock absorber having a working cylinder 31 of approximately one inch in diameter and a piston rod of approximately one-half inch in diameter, the area of the rebound chamber F, which is the area of the cylinder less that of the rod, is approximately .589 square inch and hence the total area of the shuttle passage means H was approximately .4% of the area of chamber F.

It is, of course, a difficult matter to refer with clarity to shock absorber performance on vehicles under conditions of differing ranges of activity. A vehicle travelling at slow speed and encountering an irregularity in the road will result in operation of the shock absorber in its low range as the maximum piston velocity is relatively low but at higher vehicle speeds the same irregularity will result in activation of the shock absorber in its medium or high ranges of activity, the maximum velocity attained by the piston being relatively greater. Furthermore, it is a matter of opinion as to when the shock absorber is operating in its various ranges of performance. Therefore, in order to provide reference terminology which may be readily understood in all instances, we have somewhat arbitrarily selected, for purposes of definitive reference terminology herein, the following definition of range of performance of our shock absorber. Thus an irregularity which gives rise to shock absorber strokes inducing maximum piston velocities, relative to the working cylinder in all instances, of up to about .6 foot per second will be termed the low range operation or performance of the shock absorber. Similarly maximum piston velocities of around 1.3 feet per second are termed intermediate or medium range operation and strokes inducing maximum piston velocities of around 2.6 feet per second are designated the high range operation. Velocities substantially higher than 2.6 feet per second are, as is well known, often experienced with shock absorbers in conventional vehicle operations but the foregoing values will serve as representative of typical performances of shock absorbers in general and are useful for comparison and reference purposes in defining certain of the novel characteristics of our invention.

For a given piston velocity, changes in the diameter of the piston or piston rod or of passages H or J will result in changes in fluid velocity over the values cited herein by way of example. Such changes may be made as desired within the scope of the broader aspects of our invention and our references herein to specific performance at specified piston velocities are set forth to illustrate typical preferred performances of our shock absorber for the sizes of parts set forth. The illustrated pattern of resistance performance may be generally realized to varying degree within keeping of the spirit and principles of our invention by varying the sizes of the aforesaid parts.

We claim:

1. In a direct acting hydraulic shock absorber of the type having a working cylinder closed at one end through which a piston rod extends for operable connection with a working piston reciprocably mounted in said cylinder to provide a rebound chamber adjacent said closed cylinder end and a compression chamber adjacent the other cylinder end, a tubular member surrounding said cylinder to provide a liquid reservoir, and check valve means between said compression chamber and said reservoir having a relatively large unrestricted liquid flow capacity sufficient to accommodate free liquid flow from said reservoir to said compression chamber during the rebound stroke of said piston towards said closed cylinder end; liquid transfer means resisting flow of all liquid that is passed between said compression and rebound chambers and from said compression chamber to said reservoir, said liquid transfer means consisting of (1) liquid flow restricting escape passage means operative to restrict liquid flow from said compression chamber to said reservoir, (2) liquid flow restricting shuttle passage means operative to restrict liquid interflow between said chambers on both the compression and rebound strokes of the piston to thereby cause the piston to perform useful resistance work on both strokes of said piston and (3) valve controlled liquid conducting means operable during piston compression strokes and in response to predetermined pressure differential between said chambers to allow liquid flow from said compression chamber to said rebound chamber, said shuttle passage means having such liquid flow restricting capacity relative to the liquid flow restricting capacity of said escape passage means that only a minor portion of the compression resistance work during the compression stroke of the piston is effected by the flow resistance offered by said liquid escape passage means and the major portion of the compression resistance work is effected by the flow resistance offered by said shuttle passage means, said shuttle passage means consisting of a plurality of constantly open cylindrical passages formed in said piston and having their opposite ends respectively constantly open to and communicating directly with said chambers at the faces of said piston respectively bounding said chambers, said valve controlled liquid conducting means consisting of liquid conducting groove means in the face of said piston bounding said rebound chamber and having relatively unrestricted constantly open communication with said compression chamber through cylindrical passages formed in said piston and having their opposite ends in direct communication with said chambers at the faces of said piston respectively bounding said chambers, and disk valve means engaged with said piston face in overlying relation with said groove means, all of the liquid discharged from said rebound chamber during all rebound piston strokes flowing only to said compression chamber by passage through said first-mentioned cylindrical passages entering and leaving the same at said piston faces.

2. In a shock absorber according to claim 1 wherein, each of said first-mentioned cylindrical passages has a cross-sectional area which is substantially uniform throughout the length thereof and having their said ends which open to said rebound chamber disposed radially outwardly from the outer periphery of said disk valve means.

ROSS E. LEWTON.
DONALD T. BALL.

References Cited in the file of this patent
UNITED STATES PATENTS

| Number | Name | Date |
|---|---|---|
| 1,233,969 | Brahst | July 17, 1917 |
| 2,004,380 | Nickelsen | June 11, 1935 |
| 2,036,955 | Padgett | Apr. 7, 1936 |
| 2,078,364 | Becker et al. | Apr. 27, 1937 |
| 2,087,451 | Rossman et al. | July 20, 1937 |
| 2,316,924 | Whisler | Apr. 20, 1943 |
| 2,335,907 | Boor et al. | Dec. 7, 1943 |
| 2,410,176 | Magrum | Oct. 29, 1946 |
| 2,456,736 | Rossman | Dec. 21, 1948 |
| 2,546,038 | McIntyre et al. | Mar. 20, 1951 |